United States Patent
Chang et al.

(10) Patent No.: US 10,083,808 B1
(45) Date of Patent: Sep. 25, 2018

(54) LUMINOUS KEYBOARD WITH GAMING FUNCTION

(71) Applicant: Primax Electronics Ltd., Taipei (TW)

(72) Inventors: Chen-Ming Chang, Taipei (TW);
Shi-Jie Zhang, Taipei (TW); Che-Yen Huang, Taipei (TW); Yi-Te Chou, Taipei (TW); Chung-Yuan Chen, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 0 days.

(21) Appl. No.: 15/830,286

(22) Filed: Dec. 4, 2017

Related U.S. Application Data

(60) Provisional application No. 62/528,666, filed on Jul. 5, 2017.

(51) Int. Cl.
| | |
|---|---|
| *H05K 5/00* | (2006.01) |
| *H05K 7/00* | (2006.01) |
| *H01H 13/83* | (2006.01) |
| *A63F 13/24* | (2014.01) |
| *G06F 3/02* | (2006.01) |
| *G06F 1/16* | (2006.01) |

(52) U.S. Cl.
CPC ............. *H01H 13/83* (2013.01); *A63F 13/24* (2014.09); *G06F 1/1662* (2013.01); *G06F 3/0227* (2013.01)

(58) Field of Classification Search
CPC ........................................................ G09G 5/10
USPC ..................................................... 361/679.01
See application file for complete search history.

(56) References Cited

U.S. PATENT DOCUMENTS

| | | | |
|---|---|---|---|
| 2013/0002727 A1* | 1/2013 | Chen ..................... | G06F 3/0421 345/690 |
| 2014/0004947 A1* | 1/2014 | Yamaguchi ............. | A63F 13/10 463/31 |

* cited by examiner

*Primary Examiner* — Jerry Wu
(74) *Attorney, Agent, or Firm* — Kirton McOnkie; Evan R. Witt

(57) ABSTRACT

A luminous keyboard with a gaming function includes a gaming program, plural keys, plural light-emitting elements and a control unit. When one of the plural keys is pressed down, a corresponding pressing signal is generated. When one of the plural light-emitting elements is turned on to emit a light beam, the corresponding key is illuminated. The control unit is connected with the plural keys, the plural light-emitting elements and the gaming program. The control unit turns on or turns off the plural light-emitting elements according to settings of the gaming program. Alternatively, the control unit turns off the light-emitting element corresponding to the illuminated key when the control unit receives the pressing signal corresponding to the illuminated key. In such way, the luminous keyboard can be used to play a game.

10 Claims, 15 Drawing Sheets

LUMINOUS KEYBOARD WITH GAMING FUNCTION

CROSS-REFERENCE TO RELATED APPLICATION

This application claims priority to U.S. Provisional Patent Application No. 62/528,666 filed Jul. 5, 2017, the contents of which are incorporated herein by reference.

FIELD OF THE INVENTION

The present invention relates to an input device, and more particularly to a luminous keyboard with an illuminating function.

BACKGROUND OF THE INVENTION

Generally, the widely-used peripheral input device of a computer system includes for example a mouse device, a keyboard, a trackball device, or the like. Via the keyboard, characters and symbols can be inputted into the computer system directly. As a consequence, most users and most manufacturers of input devices pay much attention to the development of keyboards. The subject of the present invention is related to a keyboard.

FIG. 1 is a schematic top view illustrating the outer appearance of a conventional keyboard. As shown in FIG. 1, there are plural keys 10 on a surface of the conventional keyboard 1. These keys 10 are classified into several types, e.g. ordinary keys 101, numeric keys 102 and function keys 103. When one of these keys 10 is pressed down by the user's finger, a corresponding signal is issued to the computer, and thus the computer executes a function corresponding to the pressed key. For example, when an ordinary key 101 is pressed down, a corresponding English letter or symbol is inputted into the computer. When a numeric key 102 is pressed down, a corresponding number is inputted into the computer. In addition, the function keys 103 (F1~F12) can be programmed to provide various functions. For example, the conventional keyboard 1 is a keyboard for a notebook computer.

With the maturity of the computing technologies, the keyboard manufacturers make efforts in designing novel keyboards with special functions in order to meet diversified requirements of different users. For this reason, luminous keyboards are favored by users. Hereinafter, the inner structure of the luminous keyboard will be illustrated in more details. FIG. 2 is a schematic cross-sectional view illustrating a conventional luminous keyboard. As shown in FIG. 2, the conventional luminous keyboard 2 comprises plural keys 20, a membrane switch circuit member 21, a light guide plate 22, a light-emitting element 23, a supporting plate 24 and an illumination circuit board 25. For succinctness, only one key 20 is shown in the drawing. Each key 20 comprises a keycap 201, a scissors-type connecting element 202 and an elastic element 203. From top to bottom, the keycap 201, the scissors-type connecting element 202, the elastic element 203, the membrane switch circuit member 21 and the supporting plate 24 of the conventional luminous keyboard 2 are sequentially shown. The light-emitting element 23 and the illumination circuit board 25 are located beside a lateral side of the membrane switch circuit member 21. For example, the conventional luminous keyboard 2 is a keyboard for a notebook computer (not shown).

In the key 20, the keycap 201 is exposed outside the conventional luminous keyboard 2. Consequently, the keycap 201 can be pressed down by the user. The keycap 201 and the supporting plate 24 are connected with each other through the scissors-type connecting element 202. The elastic element 203 is penetrated through the scissors-type connecting element 202. In addition, both ends of the elastic element 203 are contacted with the keycap 201 and the membrane switch circuit member 21, respectively. When the membrane switch circuit member 21 is pushed by the elastic element 203, a key signal is generated. The illumination circuit board 25 is located beside a lateral side of the membrane switch circuit member 21. The light-emitting element 23 is installed on the illumination circuit board 25. The light-emitting element 23 emits a light beam B to the light guide plate 22. The light guide plate 22 is used for guiding the light beam B to the keycap 201. For example, the light-emitting element 23 is a side-view light emitting diode.

As shown in FIG. 2, the keycap 201 has a light-transmissible region 2011. The light-transmissible region 2011 is exposed to the top surface of the keycap 201. That is, the light-transmissible region 2011 is a character shown on the keycap 201. Moreover, the light guide plate 22 comprises light-guiding dots 221. The light-guiding dots 221 are aligned with the light-transmissible region 2011 and located under the light-transmissible region 2011. After the light beam B from the light-emitting element 23 is introduced into the light guide plate 22, the light beam B is subjected to total internal reflection within the light guide plate 22. When the light beam B is projected on the light-guiding dots 221, the total internal reflection of the light beam B is destroyed by the light-guiding dots 221, and the light beam B is guided to the light-transmissible region 2011 of the keycap 201 by the light-guiding dots 221. Consequently, the light-transmissible region 2011 is illuminated.

As the technology of the luminous keyboard is gradually mature, the demands on the luminous keyboard are diversified. For example, before the user plays the computer game, the computer game performs a network connecting operation, a game data downloading operation or any other default operation. Then, the luminous keyboard is in a default luminous mode. In the luminous mode, the light-emitting elements in the luminous keyboard provide flickering effects. Consequently, a light show is provided to be watched by the user. However, since the fashions of the light show provided by the luminous keyboard are limited, the light shown is usually tedious to the user.

Therefore, there is a need of providing a luminous keyboard capable of providing the function of amusement.

SUMMARY OF THE INVENTION

An object of the present invention provides a luminous keyboard capable of providing the function of amusement.

In accordance with an aspect of the present invention, there is provided a luminous keyboard with a gaming function. The luminous keyboard includes a gaming program, plural keys, plural light-emitting elements and a control unit. When the gaming program is executed, a game is performed. The plural keys are exposed outside the luminous keyboard. When one of the plural keys is pressed down, a corresponding pressing signal is generated. The plural light-emitting elements are aligned with the plural keys, respectively. When one of the plural light-emitting elements is turned on to emit a light beam, the corresponding key is illuminated. The control unit is connected with the plural keys, the plural light-emitting elements and the gaming program. The control unit turns on or turns off the plural light-emitting elements according to settings of the gaming program. Alternatively, the control unit turns off the light-emitting element corresponding to the illuminated key when the control unit receives the pressing signal corresponding to the illuminated key.

In an embodiment, while the gaming program is executed to perform the game and the control unit turns on the light-emitting element, the gaming program calculates a gaming score by judging whether the pressing signal corresponding to the illuminated key is received by the control unit within a predetermined time interval. If the pressing signal corresponding to the illuminated key is received by the control unit within the predetermined time interval, the gaming program increases the gaming score and the control unit turns off the light-emitting element corresponding to the illuminated key. If the pressing signal corresponding to the illuminated key is not received by the control unit within the predetermined time interval, the gaming program does not increase or decrease the gaming score and the control unit controls the light-emitting element corresponding to an unilluminated key to emit the light beam.

In accordance with another aspect of the present invention, there is provided a luminous keyboard with a gaming function. The luminous keyboard includes a gaming program, plural keys, plural light-emitting elements and a control unit. When the gaming program is executed, a game is performed. The plural keys are exposed outside the luminous keyboard. When one of the plural keys is pressed down, a corresponding pressing signal is generated. The plural light-emitting elements are aligned with the plural keys, respectively. When one of the plural light-emitting elements is turned on to emit a first color light beam or a second color light beam, the corresponding key is illuminated to generate a luminous effect corresponding to the first color light beam or the second color light beam. The control unit is connected with the plural keys, the plural light-emitting elements and the gaming program. The control unit turns on or turns off the plural light-emitting elements according to settings of the gaming program. Alternatively, the control unit turns off the light-emitting element corresponding to the illuminated key when the control unit receives the pressing signal corresponding to the illuminated key. Alternatively, the control unit control unit turns on the light-emitting element corresponding to the unilluminated key when the control unit receives the pressing signal corresponding to the unilluminated key. The gaming program calculates a gaming score by judging whether at least two illuminated keys having the same luminous effect are neighboring keys.

In an embodiment, while the gaming program is executed to perform the game and the control unit turns on the light-emitting elements, the gaming program judges whether at least two illuminated keys having the same luminous effect are neighboring keys. If the gaming program judges that the at least two illuminated keys having the same luminous effect are neighboring keys, the control unit turns off the light-emitting elements corresponding to the at least two keys and the gaming program increases the gaming score. If the gaming program judges that the illuminated keys having the same luminous effect are not neighboring keys, the gaming program further judges whether the pressing signal corresponding to a specified illuminated key of the at least two illuminated keys is received by the control unit.

From the above descriptions, the luminous keyboard of the present invention can be used to perform a game while the gaming program is executed. The plural keys of the luminous keyboard are used as a gaming interface. In other words, the game is performed with the need of using the display screen of the computer system. In case that the user feels fatigued after the computer has been operated for a long time or the user waits for the operation of the computer, the user may operate the luminous keyboard of the present invention to play games. Consequently, the amusement efficacy is achieved.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technology, the present invention provides a luminous keyboard.

Figure 1:
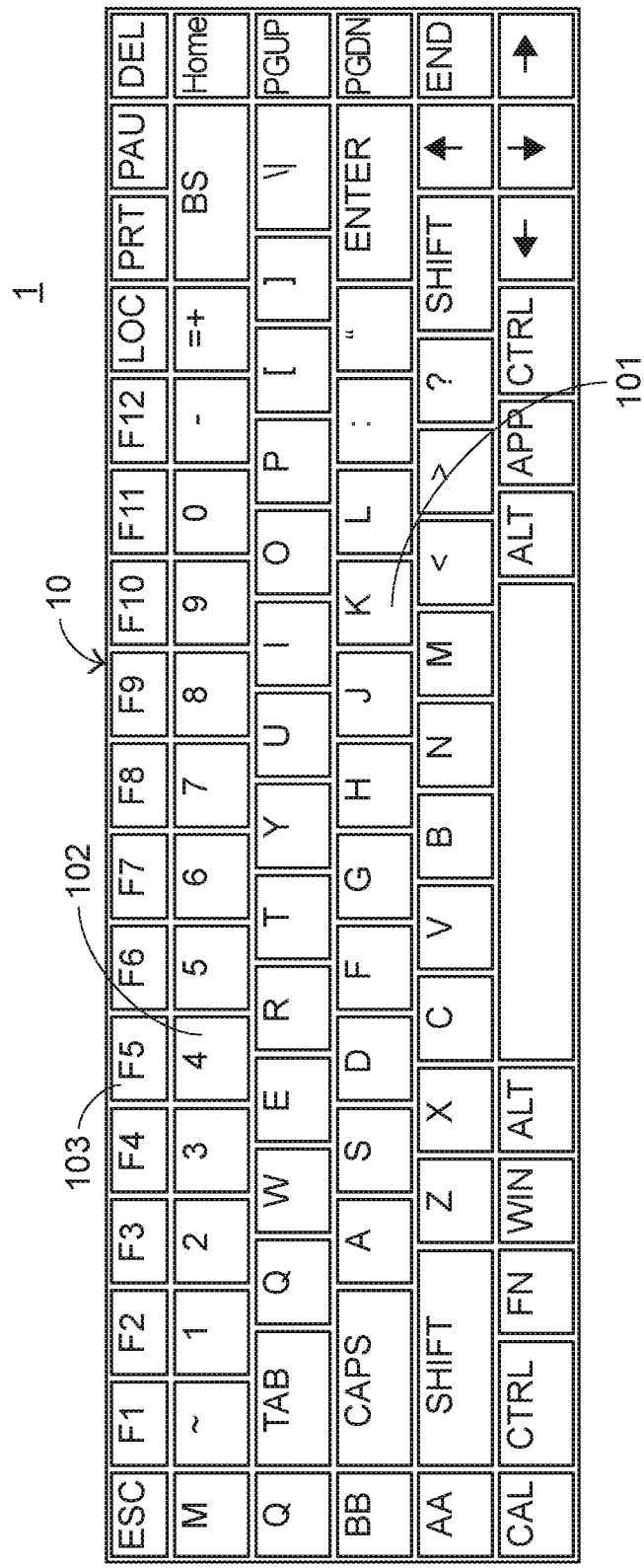
FIG. 1 is a schematic top view illustrating the outer appearance of a conventional keyboard.
Figure 2:
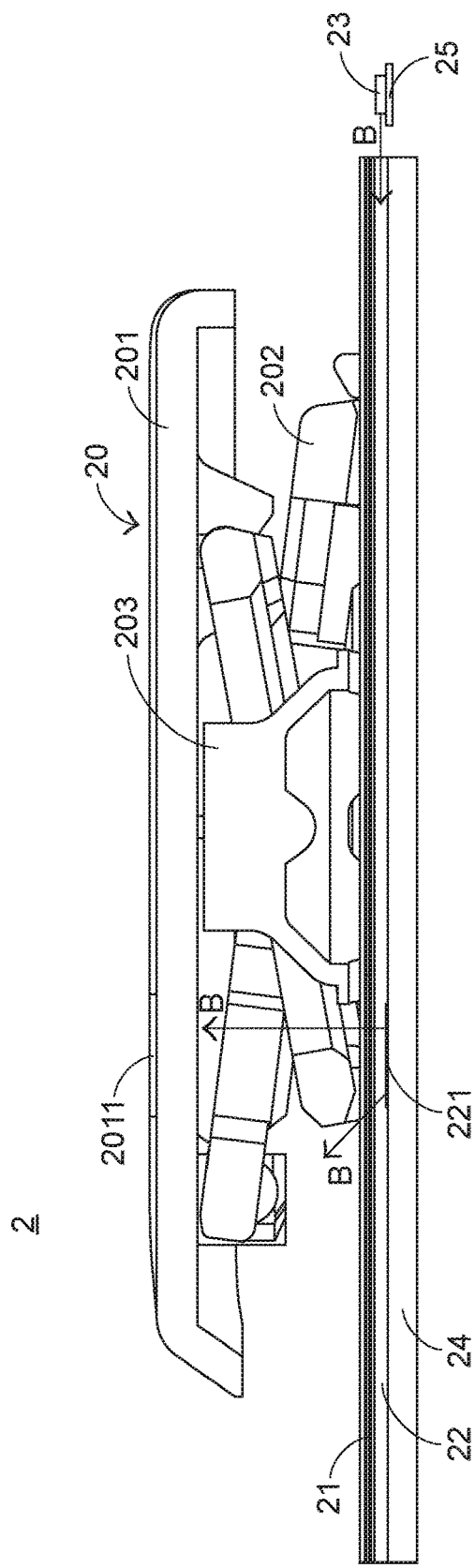
FIG. 2 is a schematic cross-sectional view illustrating a conventional luminous keyboard.
Figure 3:
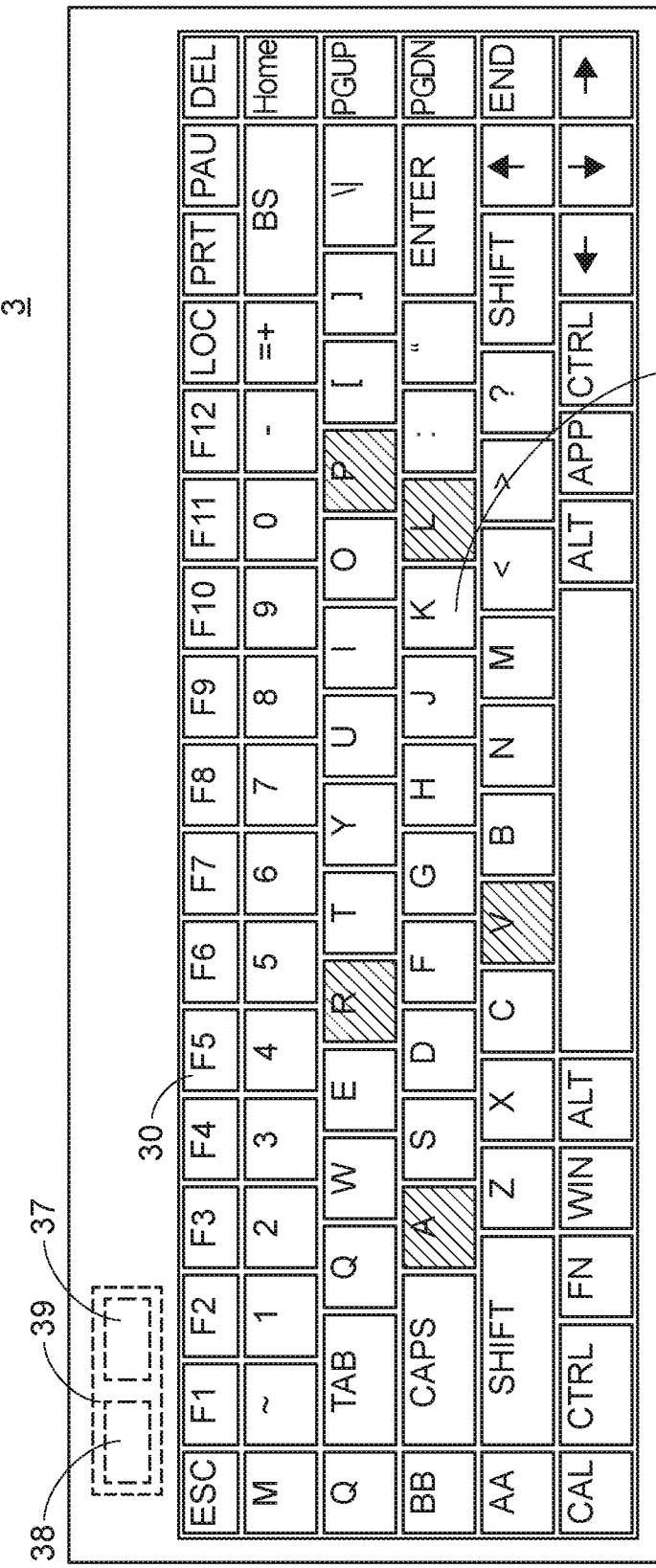
FIG. 3 is a schematic top view illustrating the outer appearance of a luminous keyboard according to a first embodiment of the present invention.
Figure 4:
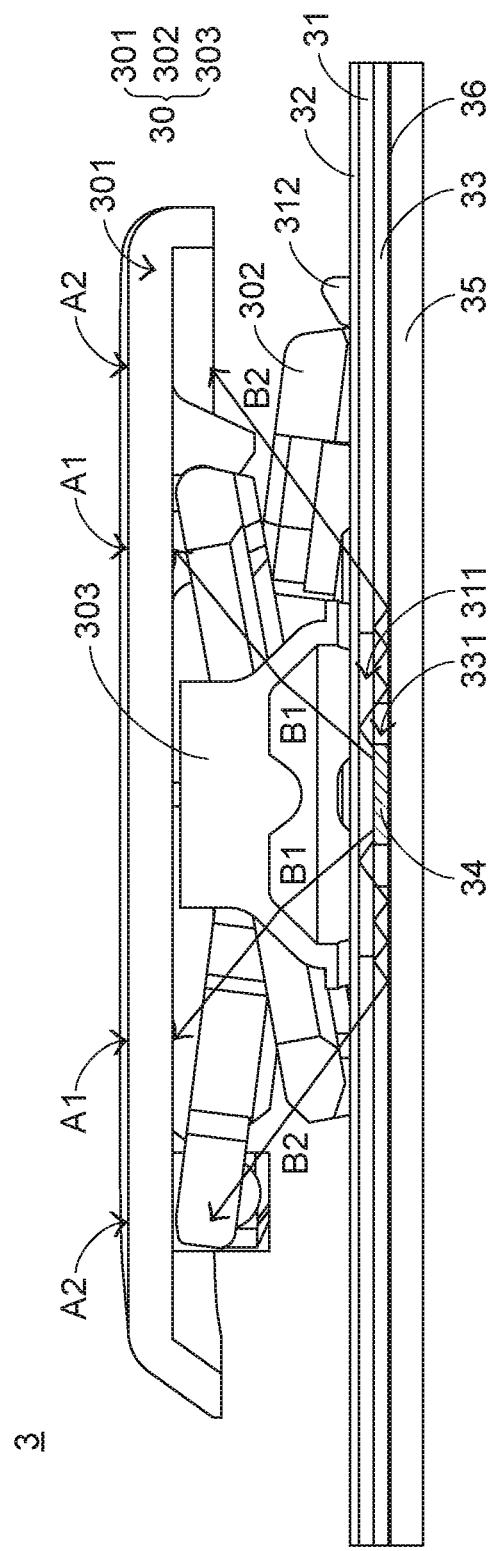
FIG. 4 is a schematic cross-sectional view illustrating a portion of the luminous keyboard according to the first embodiment of the present invention.

The structure of the luminous keyboard will be described as follows. Please refer to FIGS. 3 and 4. FIG. 3 is a schematic top view illustrating the outer appearance of a luminous keyboard according to a first embodiment of the present invention. FIG. 4 is a schematic cross-sectional view illustrating a portion of the luminous keyboard according to the first embodiment of the present invention. In this embodiment, the luminous keyboard 3 comprises plural keys 30, a supporting plate 31, a switch circuit board 32, a light guide plate 33, plural light-emitting elements 34, an illumination circuit board 35, a reflecting element 36, a gaming program 37, a control unit 38 and a main circuit board 39. For succinctness, only one key 30 and one light-emitting element 34 are shown in FIG. 4. Each light-emitting element 34 is aligned with one key 30. The plural keys 30 are exposed outside the luminous keyboard 3. The supporting plate 31 is located under the plural keys 30 and connected with the plural keys 30. Moreover, the supporting plate 31 comprises plural supporting plate openings 311 and plural hooks 312 corresponding to the plural keys 30. The switch circuit board 32 is disposed on the supporting plate 31. When the switch circuit board 32 is triggered by at least one of the plural keys 30, the switch circuit board 32 generates a corresponding key signal. The light guide plate 33 is located under the supporting plate 31. Moreover, the light guide plate 33 comprises plural light guide plate openings 331 corresponding to the plural keys 30.

The plural light-emitting elements 34 are located under the corresponding keys 30 and inserted into the corresponding light guide plate openings 331. The plural light-emitting elements 34 emit plural light beams B. The illumination circuit board 35 is located under the light guide plate 33 for supporting the plural light-emitting elements 34. Moreover, the illumination circuit board 35 is electrically connected with the plural light-emitting elements 34. The reflecting element 36 is arranged between the light guide plate 33 and the illumination circuit board 35. The reflecting element 36 is used for reflecting the light beams B. In an embodiment, the plural top-view light-emitting elements 34 are top-view light emitting diodes, the illumination circuit board 35 is a printed circuit board (PCB) or a flexible printed circuit (FPC), and the reflecting element 36 is a reflecting plate or a reflective ink layer. In case that the reflecting element 36 is the reflective ink layer, the reflective ink layer is printed or coated on a bottom surface of the light guide plate 33 or a top surface of the illumination circuit board 35. In case that the reflecting element 36 is the reflecting plate, the reflecting plate comprises plural reflecting plate openings. After the light-emitting elements 34 are penetrated through the corresponding reflecting plate openings, the light-emitting elements 34 are inserted into the corresponding light guide plate openings 331.

As shown in FIG. 4, each key 30 comprises a keycap 301, a connecting element 302 and a triggering element 303. The keycap 301 is located over the supporting plate 31 and exposed outside the luminous keyboard 3. The keycap 301 comprises a first region A1 and a second region A2. The first region A1 is located at an interior region of the keycap 301. The second region A2 is located at a periphery region of the keycap 301. The connecting element 302 is arranged between the corresponding keycap 301 and the supporting plate 31. The keycap 301 is connected with the supporting plate 31 through the connecting element 302. Consequently, the keycap 301 is movable upwardly or downwardly relative to the supporting plate 31. Particularly, the connecting element 302 is connected with the corresponding keycap 301 and the plural hooks 312 of the supporting plate 31. The triggering element 303 is arranged between the corresponding keycap 301 and the switch circuit board 32. While the keycap 301 is pressed and moved downwardly to push the triggering element 303, the triggering element 303 is subjected to deformation to trigger the switch circuit board 32. When the keycap 301 is no longer pressed, no external force is applied to the keycap 301. In response to the elasticity of the triggering element 303, the triggering element 303 is restored to its original shape to provide an upward elastic restoring force to the keycap 301. In response to the upward elastic restoring force, the keycap 301 is returned to its original position where it is not pressed. In this embodiment, the connecting element 302 is a scissors-type connecting element.

Please refer to FIG. 3 again. When the gaming program 37 is executed, a game is performed. The main circuit board 39 is disposed within the luminous keyboard 3, and electrically connected with the switch circuit board 32 (not shown in FIG. 3) and the illumination circuit board 35 (not shown in FIG. 3). The control unit 38 is installed on the main circuit board 39. The gaming program 37 is a firmware component that is burnt in the main circuit board 39 and electrically connected with the control unit 38. Consequently, the control unit 38 is connected with the plural keys 30, the plural light-emitting elements 34 and the gaming program 37 through the main circuit board 39, the switch circuit board 32 and the illumination circuit board 35. For example, according to a command from the gaming program 37, the control unit 38 turns on or turns off the plural light-emitting elements 34. Alternatively, when the control unit 38 receives a pressing signal corresponding to the illuminated key 30, the control unit 38 turns of the light-emitting element 34 corresponding to the illuminated key 30. In an embodiment, the control unit 38 is a microprocessor.

The operations of providing the luminous efficacy of the luminous keyboard will be described as follows. Please refer to FIG. 4 again. After the light-emitting element 34 is driven to emit the light beam B, the light beam B is projected upwardly and penetrated through the supporting plate opening 311 of the supporting plate 31. Then, the light beam B is divided into a first-portion beam B1 and a second-portion beam B2 according to the optical path of the light beam B. The first-portion beam B1 of the light beam B is introduced into and transmitted through the switch circuit board 32 and then projected to the triggering element 303 of the key 30. Moreover, the triggering element 303 is capable of diffusing the first-portion beam B1. After the first-portion beam B1 is transmitted through the triggering element 303, the first-portion beam B1 is diffused and uniformly projected to the first region A1 of the key 30. In an embodiment, the triggering element 303 is rubber diffuser. There are two approaches of fabricating the rubber diffuser. In accordance with the first approach, the triggering element 303 is made of a light diffusion material. In accordance with a second approach, the outer surface and/or the inner surface of the triggering element 303 is subjected to a light diffusion surface treatment. Consequently, at least one of the outer surface and the inner surface of the triggering element 303 has the function of diffusing the light beam.

The second-portion beam B2 of the light beam B cannot be transmitted through the switch circuit board 32. Since the second-portion beam B2 is blocked by the switch circuit board 32, the second-portion beam B2 is introduced into the light guide plate 33. By the light guide plate 33, the second-portion beam B2 is guided to the position far away from the upper conductive part 3211 (or the lower conductive part 3221). Under this circumstance, the second-portion beam B2 is transmitted through the switch circuit board 32 and projected to the second region A2 of the key 30. For example, the fraction of the first-portion beam B1 of the light beam B projected to the first region A1 is about 70~80%, and the fraction of the second-portion beam B2 of the light beam B projected to the second region A2 is about 20~30%. Consequently, the luminance uniformity of the keycap 301 is enhanced.

It is noted that the means for fixing the keycap is not restricted to the scissors-type connecting element. For example, another type of connecting element or a magnetic structure may be employed to fix the keycap as long as the keycap is movable relative to the supporting plate. Besides, the backlight module 31 is optionally equipped with the reflecting element 36. That is, the reflecting element 36 is not the essential component of the luminous keyboard 3.

Figure 5:
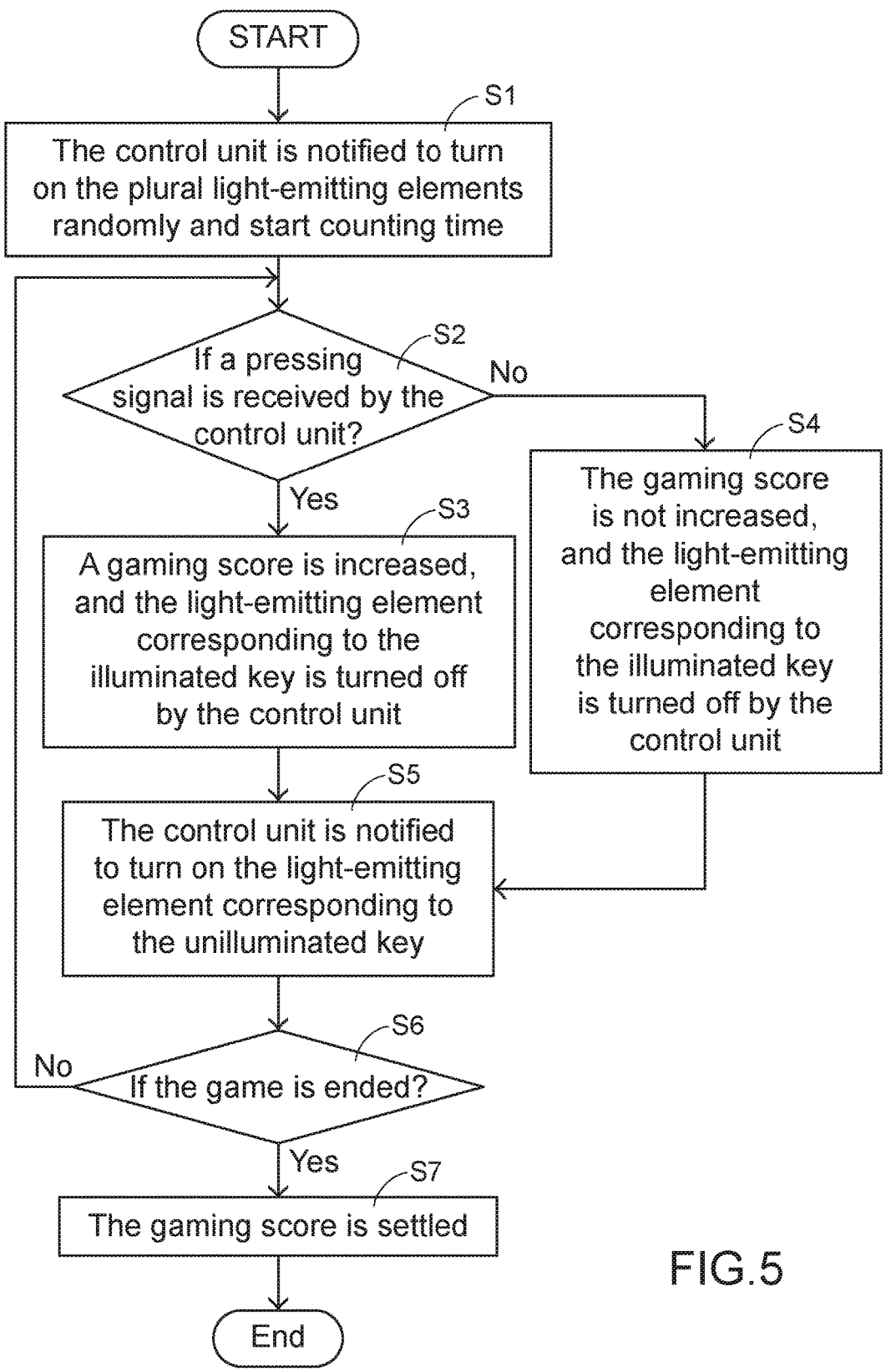
FIG. 5 is a flowchart illustrating a process of executing the gaming program of the luminous keyboard according to the first embodiment of the present invention.

The contents of the game provided by the gaming program 37 of the luminous keyboard 3 will be illustrated as follows. FIG. 5 is a flowchart illustrating a process of executing the gaming program of the luminous keyboard according to the first embodiment of the present invention. For example, a whac-a-mole game is performed when the gaming program 37 is executed. Consequently, the contents of the gaming program 37 are designed according to the rule of the whac-a-mole game. By pressing a specified hot key, a specified combination key or an additional gaming switch of the luminous keyboard 3, the gaming program 37 is activated. After the gaming program 37 is activated, the gaming program 37 performs the following steps.

In a step S1, the control unit is notified to turn on the plural light-emitting elements randomly and start counting time.

A step S2 is performed to judge whether a pressing signal is received by the control unit.

In a step S3, a gaming score is increased, and the light-emitting element corresponding to the illuminated key is turned off by the control unit.

In a step S4, the gaming score is not increased, and the light-emitting element corresponding to the illuminated key is turned off by the control unit.

In a step S5, the control unit is notified to turn on the light-emitting element corresponding to the unilluminated key.

A step S6 is performed to judge whether the game is ended.

In a step S7, the gaming score is settled.

If the result of the step S2 indicates that the pressing signal is received by the control unit, the step S3 is performed. Whereas, if the result of the step S2 indicates that the pressing signal is not received by the control unit, the step S4 is performed. If the result of the step S6 indicates that the game is ended, the step S7 is performed. Whereas, if the result of the step S6 indicates that the game is not ended, the step S2 is repeatedly done.

Figure 6A:
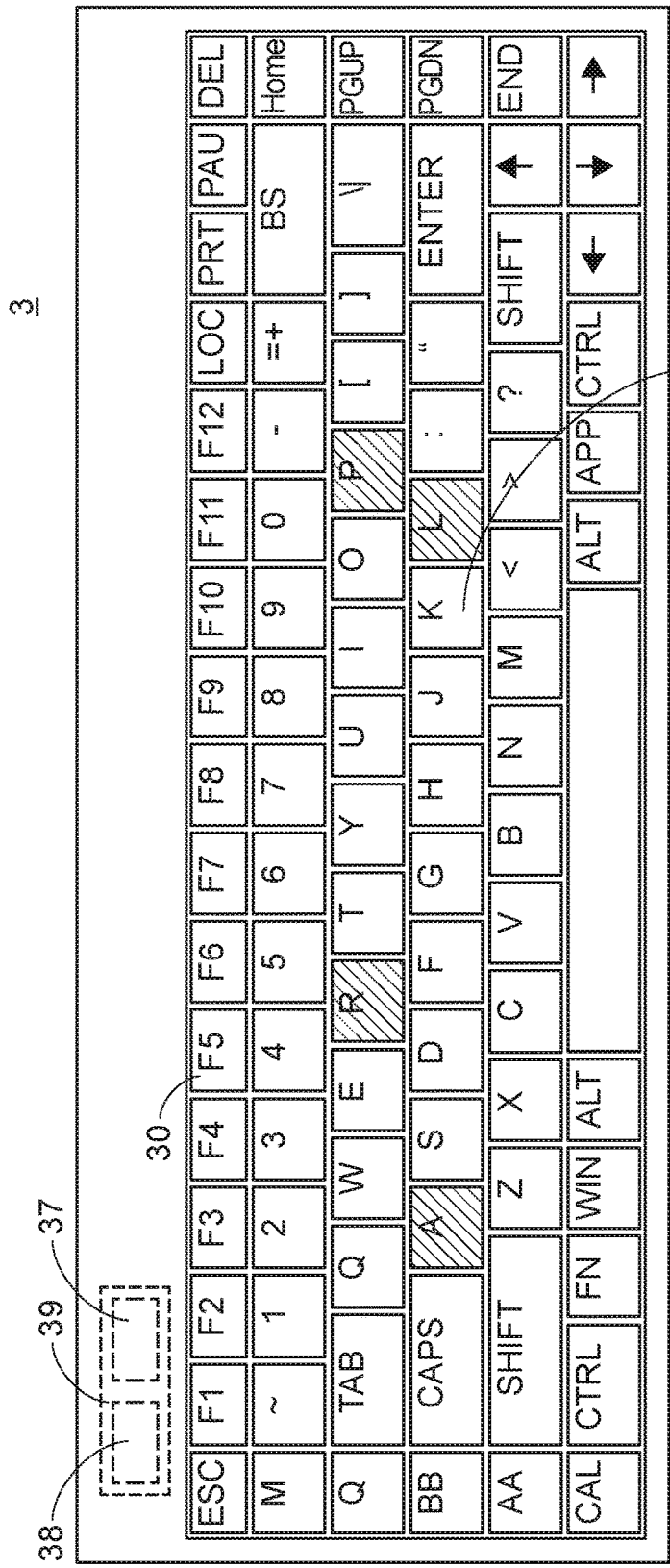
FIGS. 6A and 6B schematically illustrate the scenario of executing the gaming program of the luminous keyboard according to the first embodiment of the present invention.
Figure 6B:
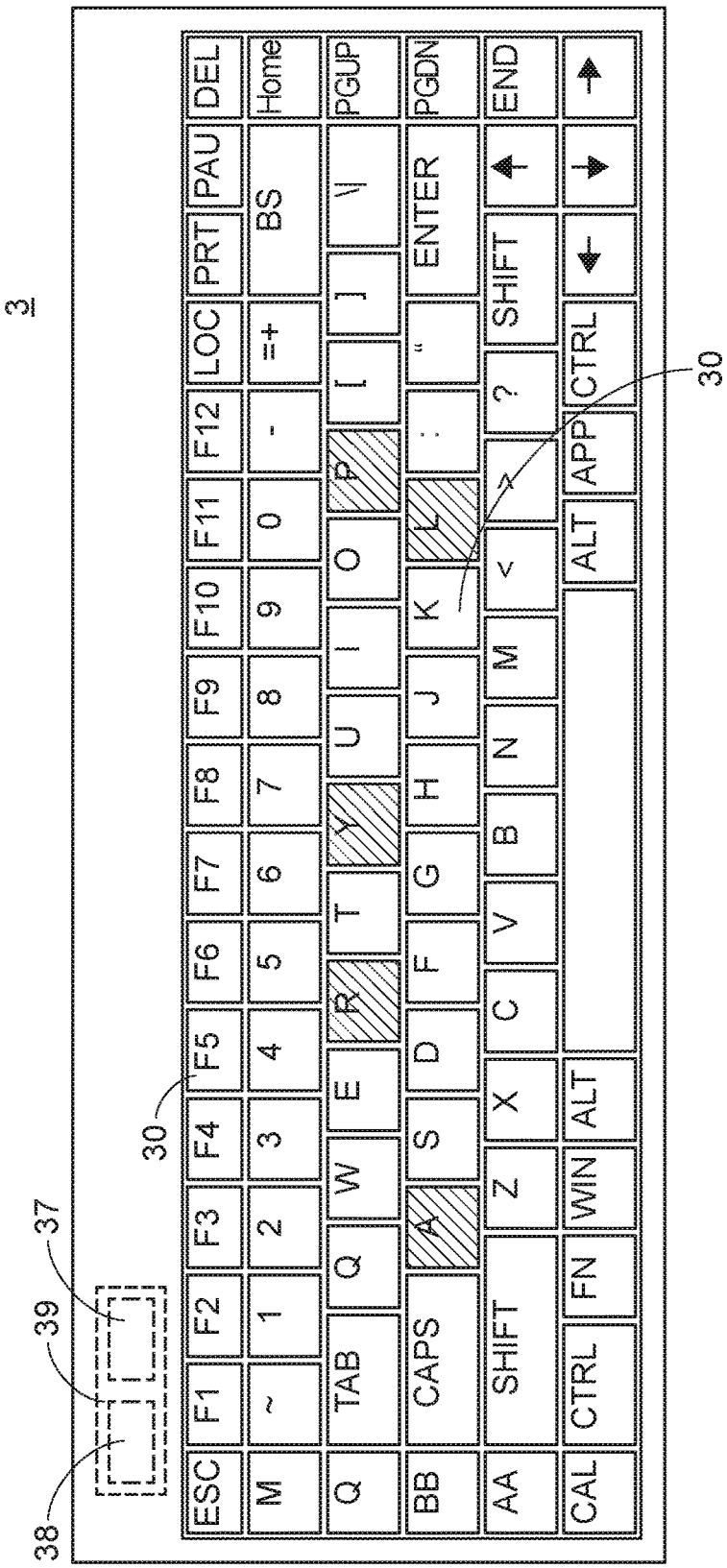

The operations of executing the gaming program 37 in the luminous keyboard 3 will be described with reference to FIGS. 3, 4, 5, 6A and 6B. FIGS. 6A and 6B schematically illustrate the scenario of executing the gaming program of the luminous keyboard according to the first embodiment of the present invention. After the gaming program 37 is activated, the gaming program 37 performs the step S1. In the step S1, the control unit 38 is notified to turn on the plural light-emitting elements 34 randomly and start counting time. Consequently, the control unit 38 turns on the light-emitting elements 34 corresponding to the key "A", the key "R", the key "V", the key "L" and the key "P" through the main circuit board 39 and the illumination circuit board 35. Meanwhile, as shown in FIG. 3, the key "A", the key "R", the key "V", the key "L" and the key "P", which are marked as oblique lines, are illuminated through the naked eyes. Consequently, the user realizes that the game is started.

After the game is started, the gaming program 37 starts counting time. In addition, the step S2 is performed to judge whether the pressing signal is received by the control unit. If the illuminated key 30 is not pressed down by the user within a predetermined time period (e.g., 5 seconds) of the gaming program 37, it means that the pressing signal is not received by the control unit 38. At the same time, the control unit 38 notifies the gaming program 37 that the pressing signal is not received. Then, the gaming program 37 performs the step S4. In the step S4, the gaming score is not increased, and the light-emitting element 34 corresponding to the illuminated key 30 is turned off by the control unit 38. For example, the light-emitting element 34 corresponding to the key "V" is turned off. Meanwhile, as shown in FIG. 6A, the key "V" of the luminous keyboard 3 is not illuminated.

If the illuminated key 30 (e.g., the key "V") is pressed down by the user within the predetermined time period, it means that the pressing signal corresponding to the key "V" is received by the control unit 38. At the same time, the control unit 38 notifies the gaming program 37 that the pressing signal corresponding to the key "V" is received. Then, the gaming program 37 performs the step S3. In the step S3, the gaming score is increased, and the light-emitting element 34 corresponding to the illuminated key V is turned off by the control unit 38. As also shown in FIG. 6A, the key "V" is not illuminated.

After the key "V" is not illuminated, the gaming program 37 performs the step S5. In the step S5, the control unit 38 is notified to turn on the light-emitting element corresponding to the unilluminated key 30 (e.g. the key Y). Meanwhile, as shown in FIG. 6B, the key "V" of the luminous keyboard 3 is illuminated. Then, in the step S6, the gaming program 37 judges whether the game is ended according to the counted time. For example, the predetermined gaming time set by the gaming program 37 is 60 seconds. If the result of the step S6 indicates that the gaming time is shorter than 60 seconds, the step S2 is ended. Whereas, if the result of the step S6 indicates that the gaming time reaches 60 seconds, the step S7 is performed. In the step S7, the gaming score is settled. In the steps S2~S6, the user may continuously press down the illuminated keys 30 to perform the game until the gaming time reaches 60 seconds. In other words, the operations of the gaming program 37 can provide the function of amusement.

The following five aspects should be specially described. Firstly, the gaming program 37 is installed in the luminous keyboard 3. It is noted that the installation position of the gaming program 37 is not restricted. For example, in another embodiment, the gaming program is installed in a computer host that is in communication with the luminous keyboard.

Secondly, since the game is performed in the luminous keyboard 3, the gaming score may be expressed according to the luminous effects of some specified keys. For example, the keys "F1"~"F12" are set as a gaming score field. When the gaming score is accumulated to a specified value, the key "F1" is illuminated. As the gaming score is continuously accumulated, the other keys "F2"~"F12" are correspondingly illuminated. According to the luminous effects of these keys, the user can realize the gaming score at present.

Thirdly, in this embodiment, the game is ended when the predetermined gaming time of the gaming program 37 is reached. It is noted that the timing of ending the game is not restricted. For example, in another embodiment, the game is ended when the number of light-emitting elements that are turned off from the beginning of the game reaches a specified number. That is, the step S6 is performed to judge whether the game is ended according to the number of the turned-off light-emitting elements.

Fourthly, in this embodiment, the gaming program 37 increases the gaming score when the illuminated keys 30 are pressed down within the predetermined gaming time. If the illuminated keys 30 are not pressed down within the predetermined gaming time, the gaming score is not increased. It is noted that the way of increasing or decreasing the gaming score is not restricted. For example, in another embodiment, the gaming program also increases the gaming score when the illuminated keys are pressed down within the predetermined gaming time. However, if the illuminated keys are not pressed down within the predetermined gaming time, the gaming score is decreased. Consequently, the stimulation of the game is enhanced.

Fifthly, the game is immediately ended if the gaming program 37 is inactivated while the game is performed. Alternatively, if a pressing signal for inactivating the gaming program (e.g., a pressing signal corresponding to a specified hot key, a specified combination key or an additional gaming switch) is received by the control unit 38, the gaming program 37 is inactivated and the game is ended.

In an embodiment, the gaming program 37 further defines plural game stages. In the earlier stage, the difficulty of playing the game is lower. Under this circumstance, the time interval of turning off the light-emitting element is longer, and the response time for the user is longer. In the later stage, the difficulty of playing the game is higher. Under this circumstance, the time interval of turning off the light-emitting element is shorter, and the response time for the user is shorter. In such way, the amusement efficacy is enhanced.

Figure 7:
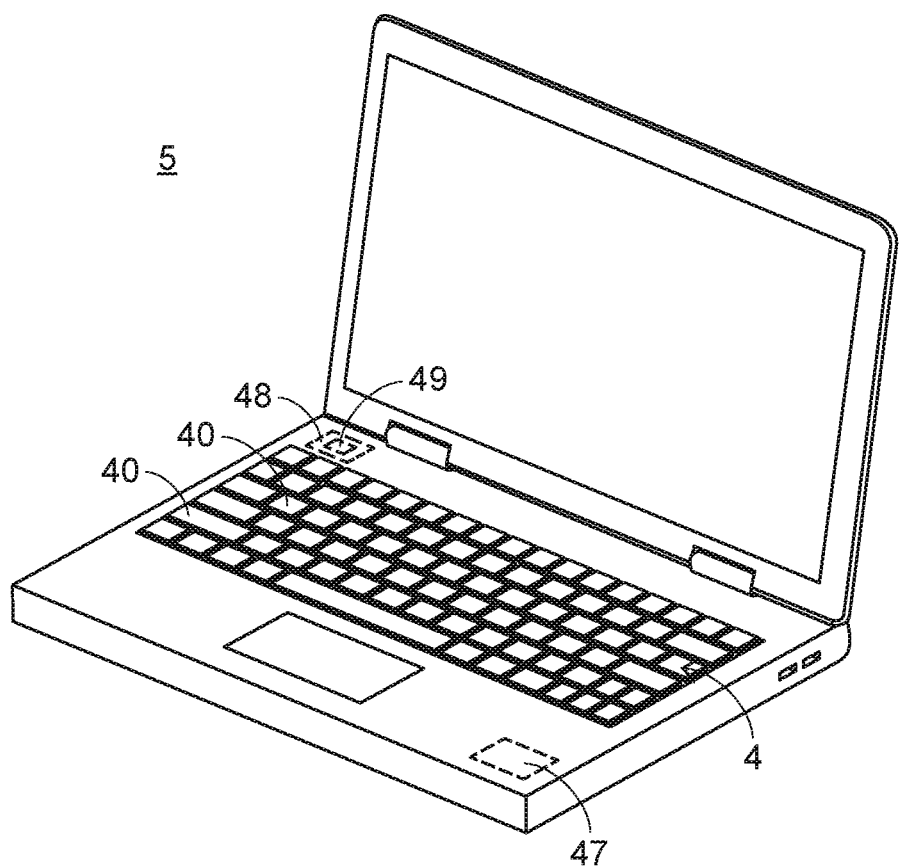
FIG. 7 is a schematic view illustrating a computer system using a luminous keyboard according to a second embodiment of the present invention.

The present invention further provides a second embodiment, which is distinguished from the first embodiment. FIG. 7 is a schematic view illustrating a computer system using a luminous keyboard according to a second embodiment of the present invention. As shown in FIG. 7, the luminous keyboard 4 is installed on a computer system 5. The luminous keyboard 4 comprises plural keys 40, a supporting plate (not shown), a switch circuit board (not shown), a light guide plate (not shown), plural light-emitting elements (not shown), an illumination circuit board (not shown), a reflecting element (not shown), a gaming program 47, a control unit 48 and a main circuit board 49. Except for the installation and the content of the gaming program 47, the structure of the luminous keyboard 4 is similar to that of the luminous keyboard 3 of the first embodiment. As shown in FIG. 7, the gaming program 47 is a software component that is installed on the computer system 5. For example, the computer system 5 is a notebook computer.

Figure 8A:
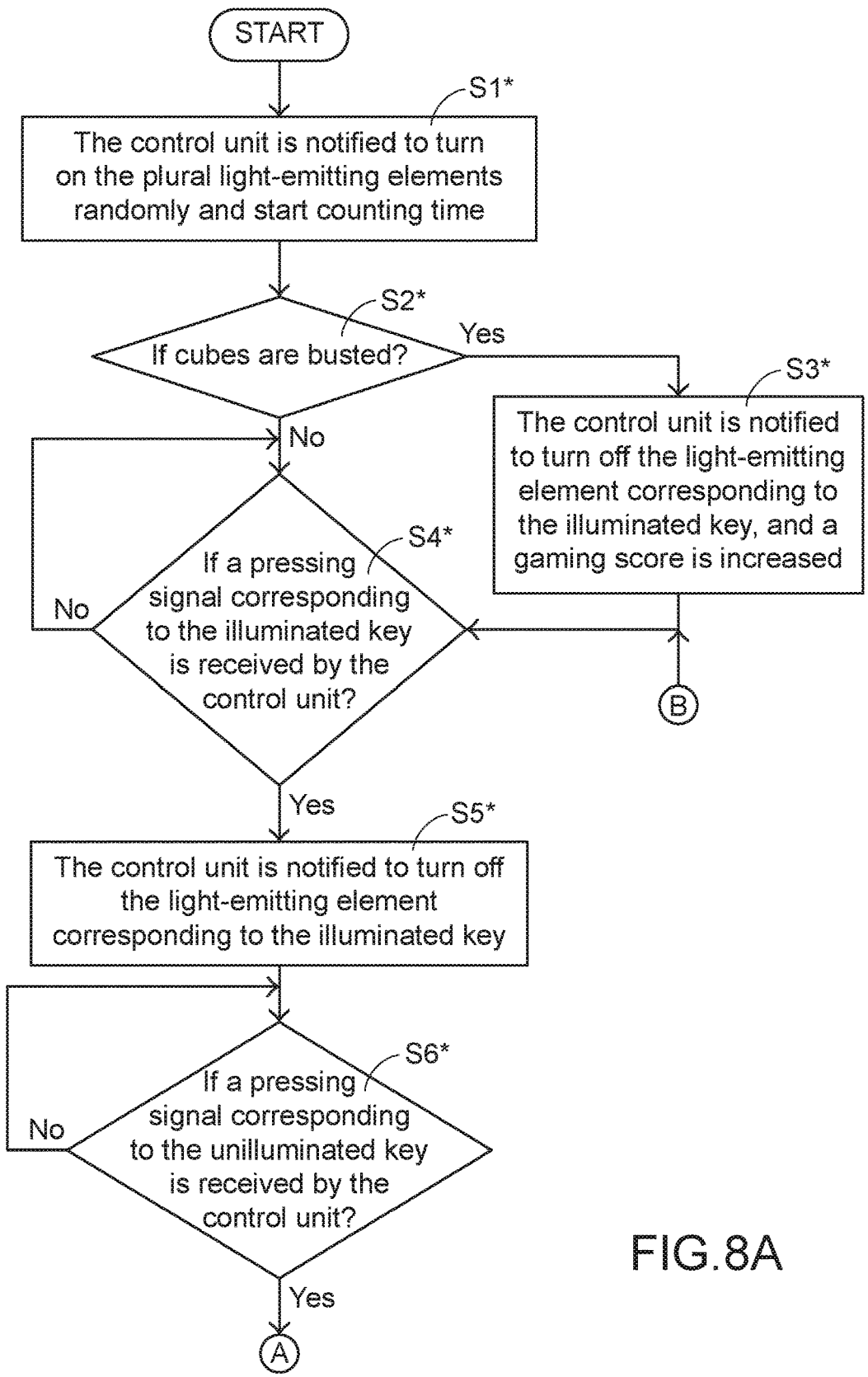
FIGS. 8A and 8B illustrate a flowchart illustrating a process of executing the gaming program of the luminous keyboard according to the second embodiment of the present invention.
Figure 8B:
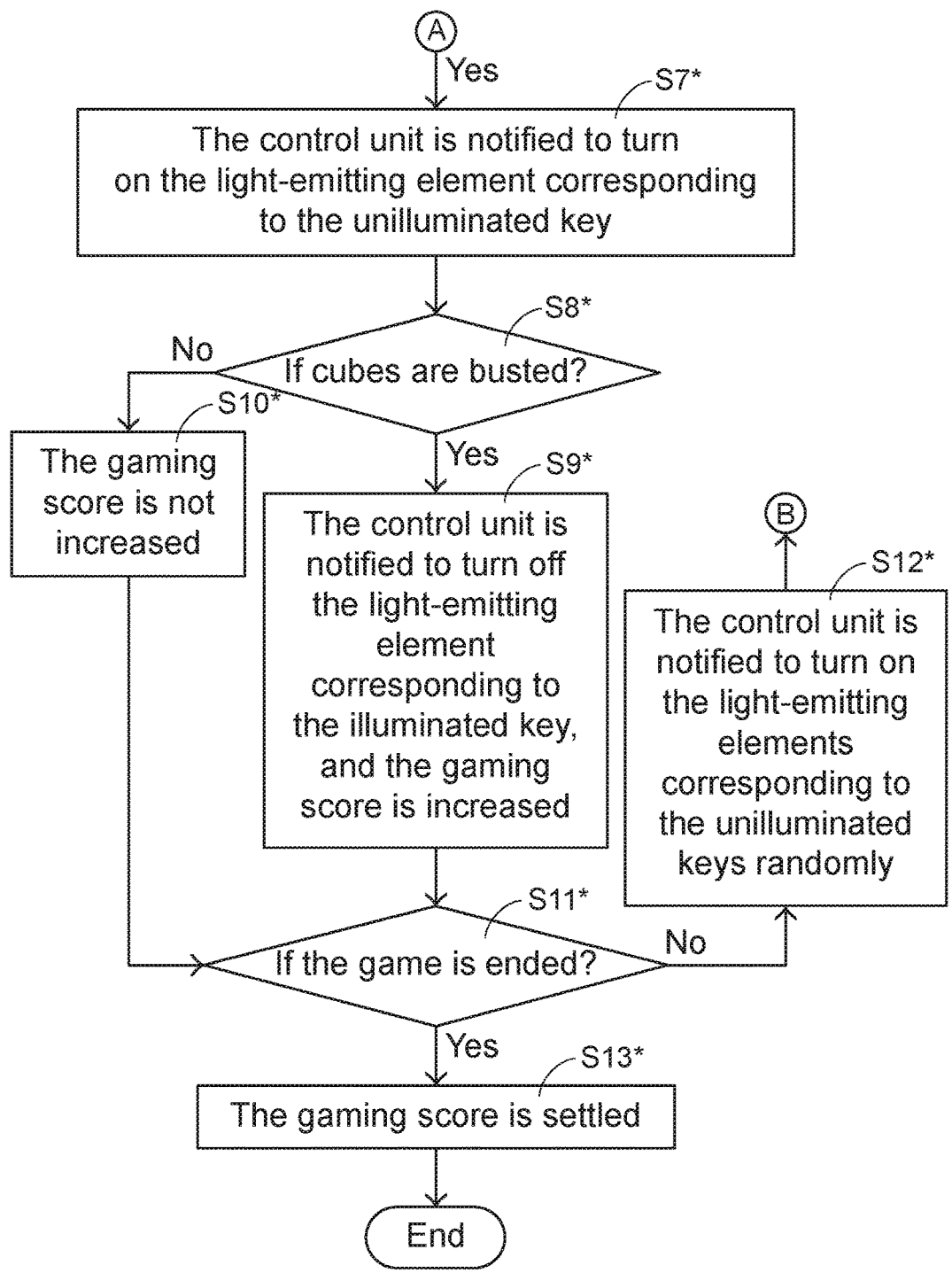

The contents of the game provided by the gaming program 47 of the luminous keyboard 4 will be illustrated as follows. FIGS. 8A and 8B illustrate a flowchart illustrating a process of executing the gaming program of the luminous keyboard according to the second embodiment of the present invention. For example, a cube buster game is performed when the gaming program 47 is executed. Consequently, the contents of the gaming program 47 are designed according to the rule of the cube buster game. After the gaming program 47, the gaming program 47 performs the following steps.

In a step S1*, the control unit is notified to turn on the plural light-emitting elements randomly and start counting time.

A step S2* is performed to judge whether cubes are busted.

In a step S3*, the control unit is notified to turn off the light-emitting element corresponding to the illuminated key, and a gaming score is increased.

A step S4* is performed to judge whether a pressing signal corresponding to the illuminated key is received by the control unit.

In a step S5*, the control unit is notified to turn off the light-emitting element corresponding to the illuminated key.

A step S6* is performed to judge whether a pressing signal corresponding to the unilluminated key is received by the control unit.

In a step S7*, the control unit is notified to turn on the light-emitting element corresponding to the unilluminated key.

A step S8* is performed to judge whether cubes are busted.

In a step S9*, the control unit is notified to turn off the light-emitting element corresponding to the illuminated key, and the gaming score is increased.

In a step S10*, the gaming score is not increased.

A step S11* is performed to judge whether the game is ended.

In a step S12*, the control unit is notified to turn on the light-emitting elements corresponding to the unilluminated keys randomly.

In a step S13*, the gaming score is settled.

If the result of the step S2* indicates that the cubes are busted, the step S3* is performed. Whereas, if the result of the step S2* indicates that the cubes are busted, the step S4* is performed. If the result of the step S4* indicates that pressing signal corresponding to the illuminated key is received by the control unit, the step S5* is performed. Whereas, if the result of the step S4* indicates that pressing signal corresponding to the illuminated key is not received by the control unit, the step S4* is repeatedly done. If the result of the step S6* indicates that the pressing signal corresponding to the unilluminated key is received by the control unit, the step S7* is performed. Whereas, if the result of the step S6* indicates that the pressing signal corresponding to the unilluminated key is received by the control unit, the step S6* is repeatedly done. If the result of the step S8* indicates that the cubes are busted, the step S9* is performed. Whereas, if the result of the step S8* indicates that the cubes are not busted, the step S10* is performed. If the result of the step S11* indicates that the game is ended, the step S13* is performed. Whereas, if the result of the step S11* indicates that the game is not ended, the step S12* is performed.

Figure 9A:
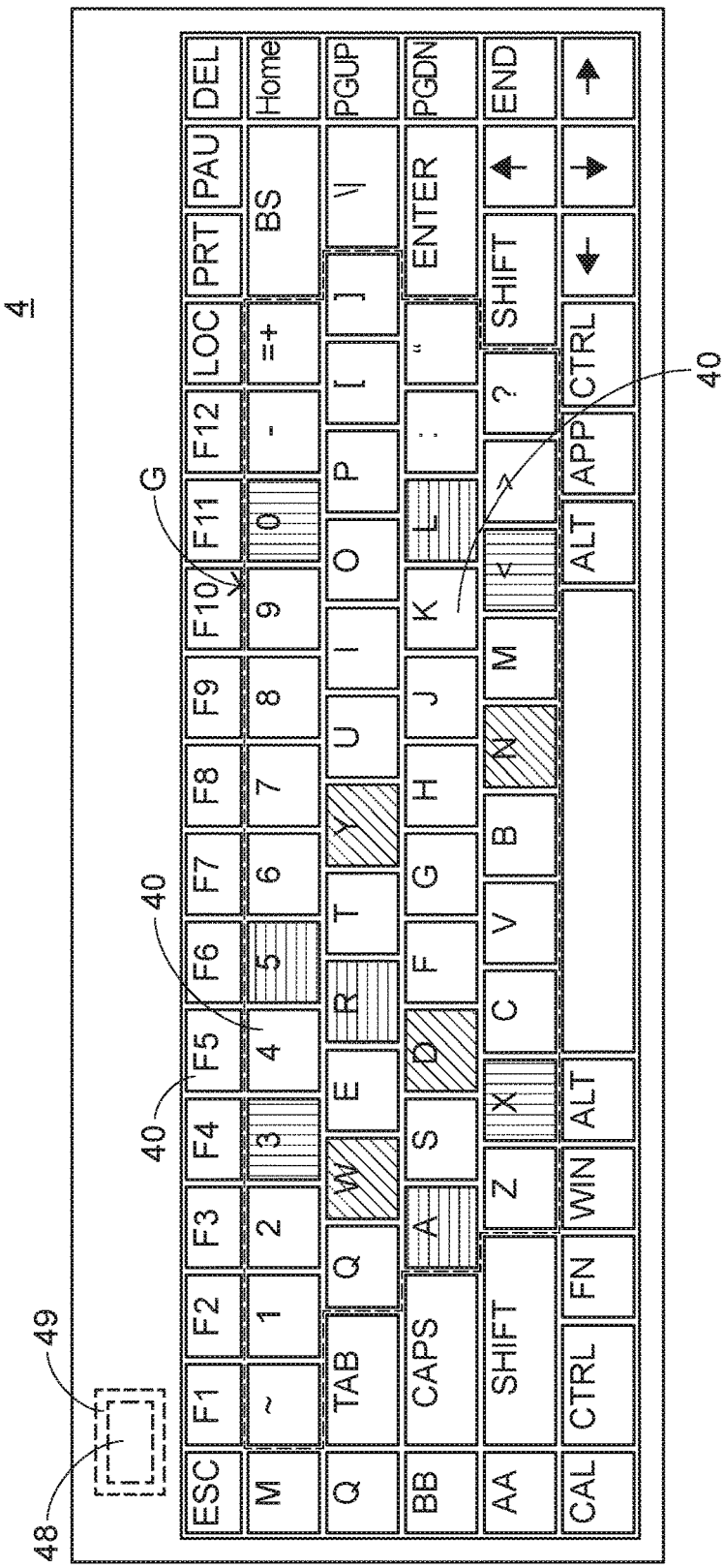
FIGS. 9A-9E schematically illustrate the scenario of executing the gaming program of the luminous keyboard according to the second embodiment of the present invention.

The operations of executing the gaming program 47 in the luminous keyboard 4 will be described with reference to FIGS. 7, 8 and 9A-9E. FIGS. 9A-9E schematically illustrate the scenario of executing the gaming program of the luminous keyboard according to the second embodiment of the present invention. After the gaming program 47 is activated, the gaming program 47 performs the step S1*. In the step S1*, the control unit 48 is notified to turn on the plural light-emitting elements 44 randomly and start counting time. Consequently, the control unit 48 randomly turns on plural light-emitting elements 44 corresponding to plural keys 40 through the main circuit board 49. As shown in FIG. 9A, the light-emitting elements 44 corresponding to the key "3", the key "5", the key "0", the key "W", the key "R", the key "Y", the key "A", the key "D", the key "L", the key "X", the key "N" and the key "<" are turned on.

The light-emitting elements corresponding to the key "3", the key "0", the key "X" and the key "<" emit a first color light beam. Consequently, these keys are illuminated through a first luminous effect, which is marked by vertical lines. For example, the first luminous effect is the effect of emitting red light. Similarly, the light-emitting elements corresponding to the key "5", the key "R", the key "A" and the key "L" emits a second color light beam. Consequently, these keys are illuminated through a second luminous effect, which is marked by horizontal lines. For example, the second luminous effect is the effect of emitting yellow light. Similarly, the light-emitting elements corresponding to the key "W", the key "Y", the key "D" and the key "N" emits a third color light beam. Consequently, these keys are illuminated through a third luminous effect, which is marked by oblique lines. For example, the third luminous effect is the effect of emitting blue light. According to the settings of the gaming program 47, one key 40 corresponds to a cube of the game. Moreover, the region of the luminous keyboard circumscribed by dotted lines is defined as a gaming region G. The user may operate the game through the keys 40 in the gaming region G.

The luminous effect of the keys 40 can be viewed by the user through the naked eyes. Consequently, the user realizes that the game is started. After the game is started, the gaming program 47 starts counting time. In addition, the step S2* is performed to judge whether cubes are busted. According to the settings of the gaming program 47, three neighboring cubes with the same luminous effect are busted. The gaming program 47 realizes the luminous states of the plural light-emitting elements through the control unit 48. According to the luminous states of the plural light-emitting elements, the gaming program 47 judge whether the condition of busting the cubes is satisfied. In the scenario of FIG. 9A, the gaming program 47 judge that the condition of busting the cubes is not satisfied. Consequently, the step S4* is subsequently performed. Whereas, if the gaming program 47 judge that the condition of busting the cubes is satisfied, the step S3* is performed. That is, the control unit 48 is notified to turn off the light-emitting elements corresponding to the illuminated keys, and the gaming score is increased. Since these light-emitting elements are not illuminated, the purpose of busting the cubes is achieved. After the step S3*, the step S4* is subsequently performed.

Figure 9B:
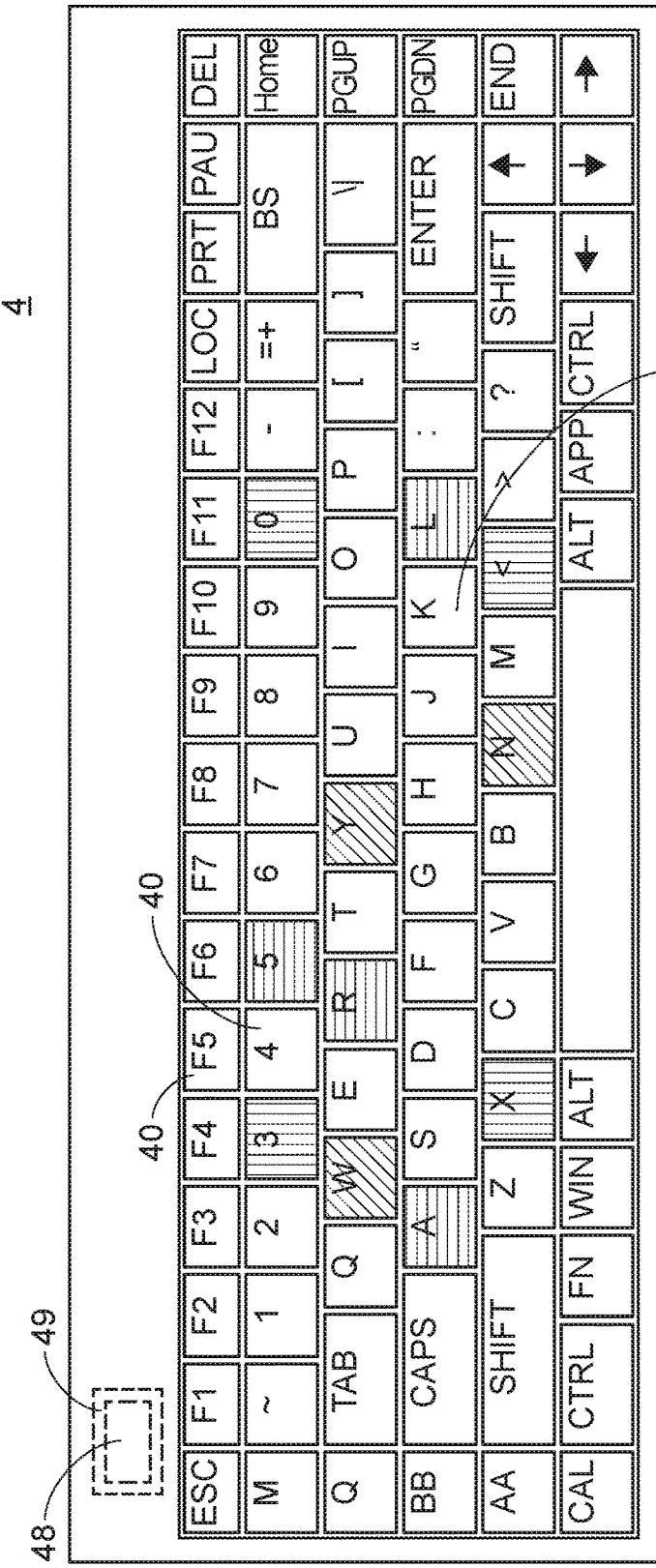

In the step S4*, the gaming program 47 judges whether the pressing signal corresponding to the illuminated key is received by the control unit 47. For example, the illuminated key 40 (e.g., the key "D") is pressed down. Consequently, the control unit 48 receives the pressing signal corresponding to the key "D". Since the judging condition of the step S4* is satisfied, the gaming program 47 performs the step S5*. Meanwhile, the control unit 48 is notified to turn off the light-emitting element corresponding to the illuminated key (i.e., the key "D"). Consequently, as shown in FIG. 9B, the key "D" of the luminous keyboard 4 is not illuminated. Whereas, if the illuminated key 40 is not pressed down, the control unit 48 does not receive the corresponding pressing signal. Since the judging condition of the step S4* is not satisfied, the gaming program 47 performs the step S4* again until the control unit 48 receives the pressing signal corresponding to the illuminated key.

After the step S5*, the gaming program 47 judges whether a pressing signal corresponding to the unilluminated key 40 is received by the control unit 48 (Step S6*). For example, the unilluminated key 40 (e.g., the key "H") is pressed down. Consequently, the control unit 48 receives the pressing signal corresponding to the key "H". Since the judging condition of the step S6* is satisfied, the gaming program 47 performs the step S7*. Meanwhile, the control unit 48 is notified to turn on the light-emitting element corresponding to the unilluminated key 40 (i.e., the key "H"). The luminous effect corresponding to the key "H" is identical to the luminous effect corresponding to the key "D", which is turned off in the step S5*. That is, the key "H" is illuminated through the third luminous effect. Whereas, if the unilluminated key 40 is not pressed down, the control unit 48 does not receive the corresponding pressing signal. Since the judging condition of the step S6* is not satisfied, the gaming program 47 performs the step S6* again until the control unit 48 receives the pressing signal corresponding to the unilluminated key.

Figure 9C:
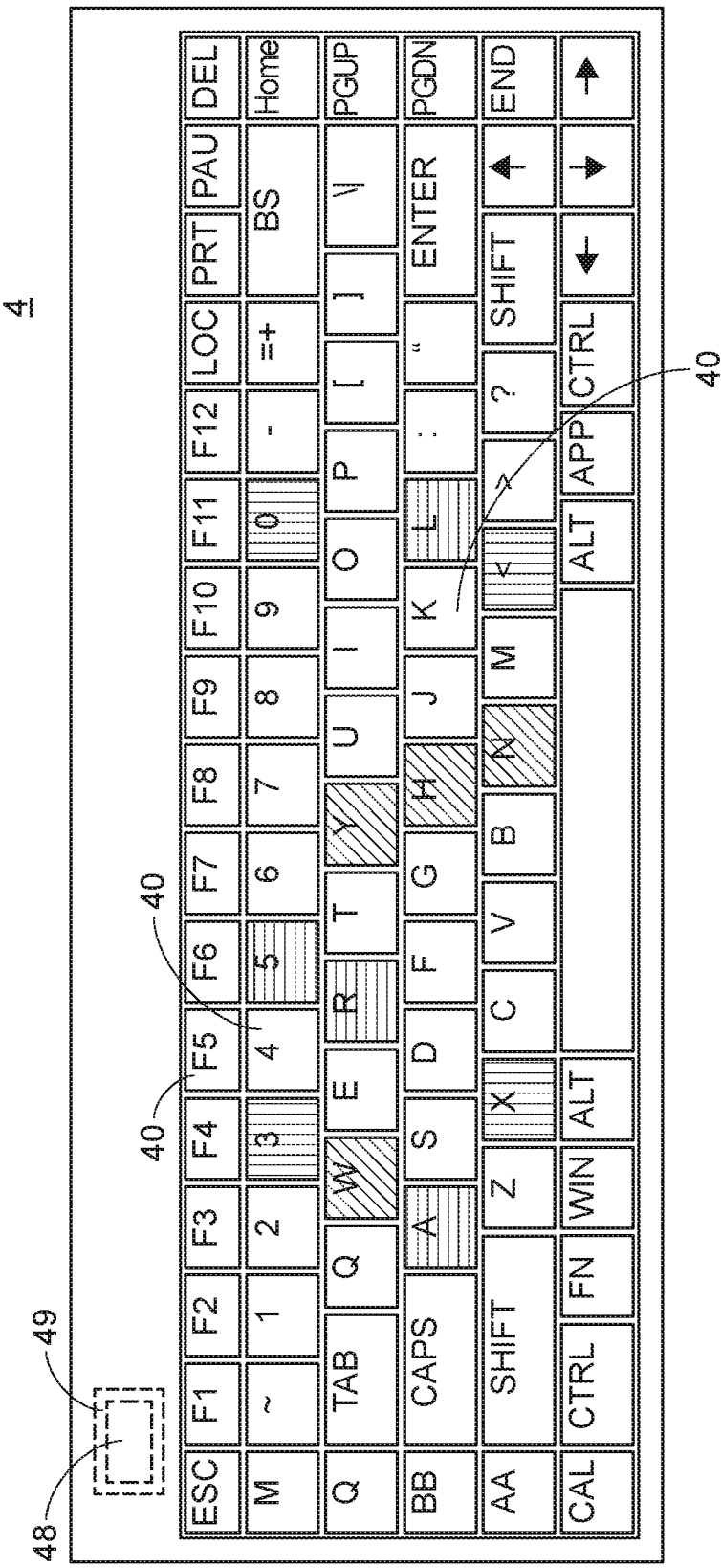
Figure 9D:
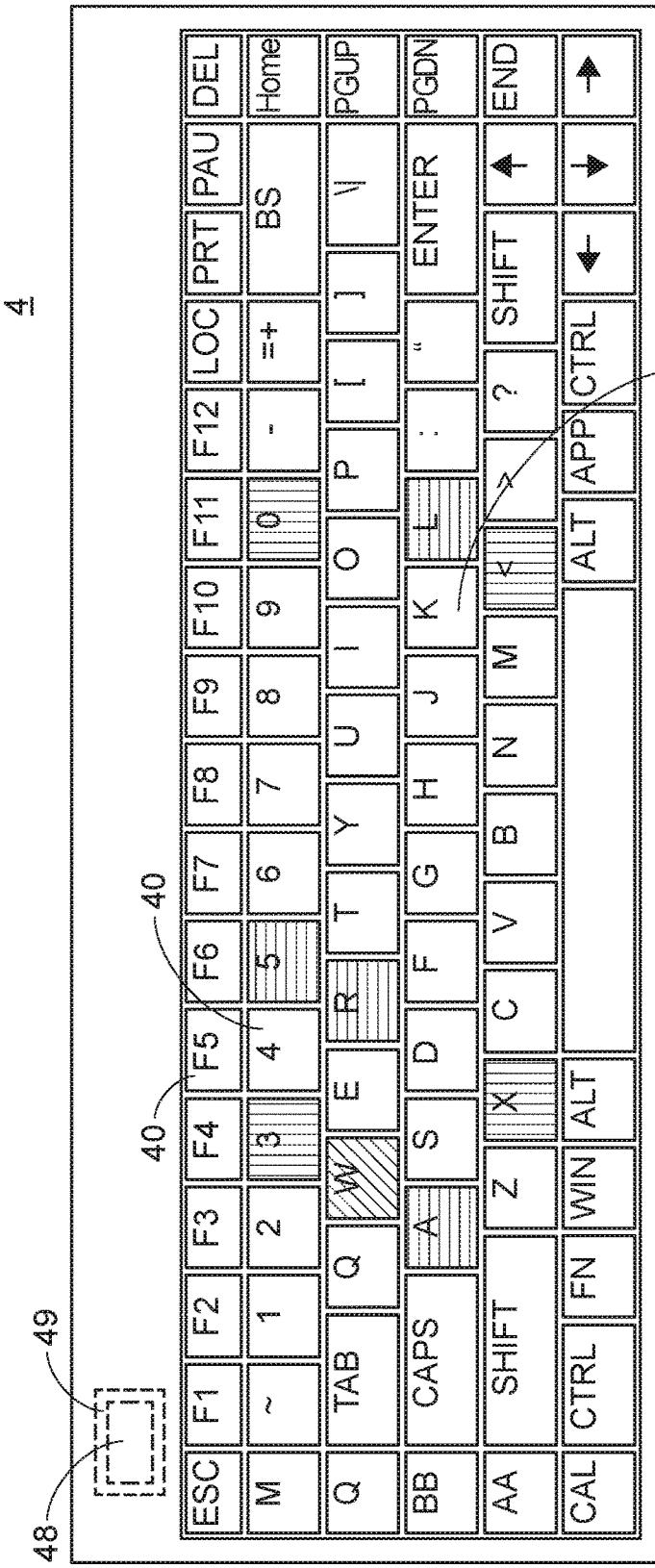

Then, the gaming program 47 performs the step S8* of judging whether cubes are busted. Through the control unit 48, the gaming program 47 judges that the key "Y", the key "H" and the key "N" of the luminous keyboard 4 as shown in FIG. 9C have the same luminous effect and are neighboring keys. Consequently, the gaming program 47 performs the step S9*. Meanwhile, the control unit 48 is notified to turn off the light-emitting element corresponding to the illuminated key 40, and the gaming score is increased. As shown in FIG. 9D, the key "Y", the key "H" and the key "N" of the luminous keyboard 4 are not illuminated. Whereas, if the judging condition of the step S8* is not satisfied, the gaming program 47 performs the step S10*. Meanwhile, the gaming score is not increased.

After the step S9* or the step S10*, the gaming program 47 performs the step S11* of judging whether the game is ended. There are two conditions of determining the timing of ending the game. In a first condition, the game is ended according to the counted time. For example, the predetermined gaming time set by the gaming program 47 is 180 seconds. If the result of the step S11* indicates that the gaming time is shorter than 180 seconds, the gaming program 47 performs the step S12*. Whereas, if the result of the step S11* indicates that the gaming time reaches 180 seconds, the gaming program 47 performs the step S13* to end the game. In a second condition, the game is ended when all of the keys in the gaming region G are illuminated. If the result of the step S11* indicates that all of the keys in the gaming region G are illuminated, it means that the game cannot be continuously performed. Meanwhile, the gaming program 47 performs the step S13*. If the result of the step S11* indicates that not all of the keys in the gaming region G are illuminated, the gaming program 47 performs the step S12*.

Figure 9E:
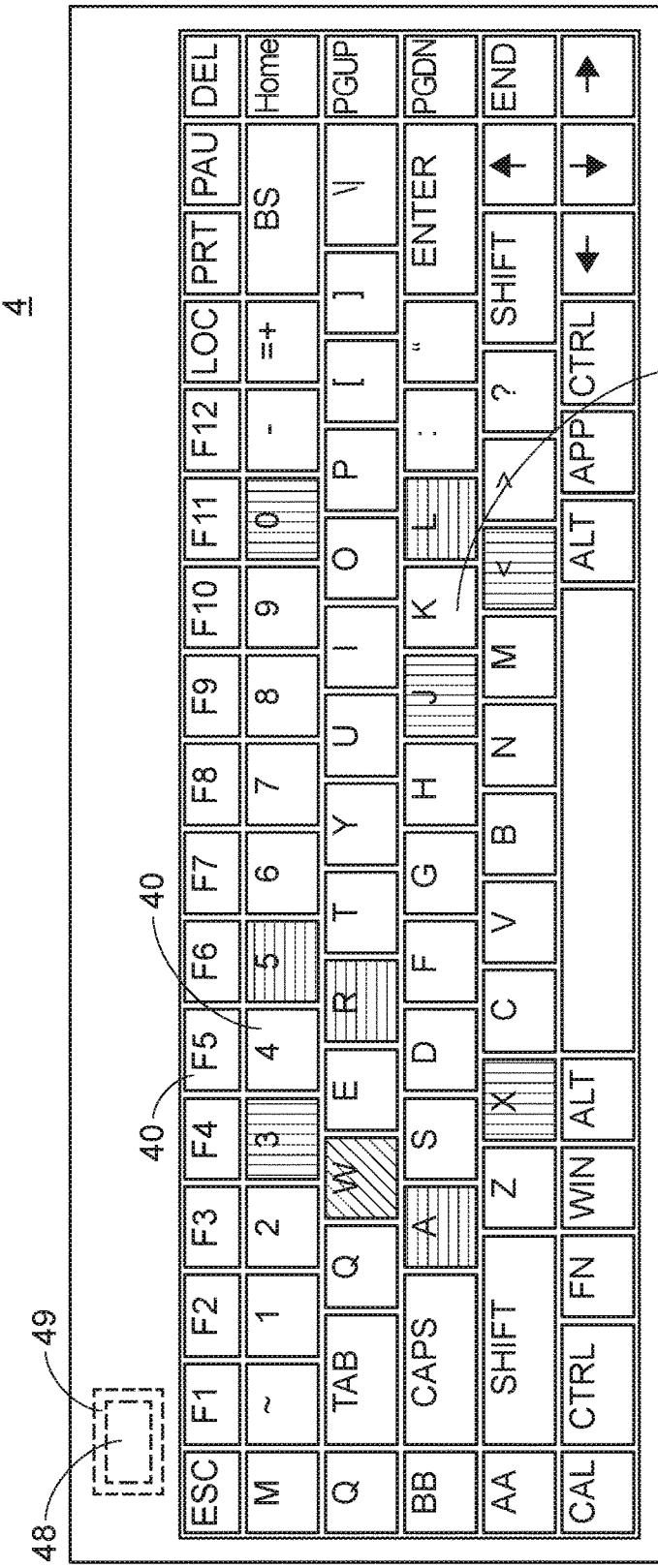

In the step S12*, the gaming program 47 notifies the control unit 47 to turn on the light-emitting elements 44 corresponding to the unilluminated keys 40 randomly. For example, the light-emitting element corresponding to the key "J" is turned on to emit a light beam with an arbitrary light color in a random manner. As shown in FIG. 9E, the key "J" of the luminous keyboard 4 is illuminated. After the step S12*, the gaming program 47 performs the step S4* again. Consequently, the game is continuously performed. During the process of performing the steps S2*~S12*, the user may continuously press down the illuminated keys 40 to perform the game. The game is ended until the gaming time is reached.

The following two aspects should be specially described. Firstly, the ways of moving the cubes by the gaming program 47 are determined according to the following settings. As shown in FIG. 9A, the gaming region G of the luminous keyboard 4 is divided into two zones by the key "5", the key "R", the key "D" and the key "X". The cubes in the left zone cannot be moved to the right zone. Similarly, the cubes in the right zone cannot be moved to the left zone. For example, if the user intends to move the cube corresponding to the key "W" to the position corresponding to the key "H", the gaming program 47 cannot move the cube corresponding to the key "W" because the key "W" and "H" are blocked by the illuminated keys "5", "R", "D" and "X". However, after the cube corresponding to the key "D" is moved to the position corresponding to the key "H" and the cube is busted, the gaming region G is not divided into the two zones by the key "5", the key "R", the key "D" and the key "X". Meanwhile, the cube in the luminous keyboard can be moved arbitrarily.

Secondly, the gaming score may be expressed according to the luminous effects of some specified keys. For example, like the first embodiment, the keys "F1"~"F12" are set as a gaming score field to show the gaming score. Alternatively, the gaming score is shown on a display screen of the computer system while the game in the luminous keyboard is performed.

From the above descriptions, the luminous keyboard of the present invention can be used to perform a game while the gaming program is executed. The plural keys of the luminous keyboard are used as a gaming interface. In other words, the game is performed with the need of using the display screen of the computer system. In case that the user feels fatigued after the computer has been operated for a long time or the user waits for the operation of the computer, the user may operate the luminous keyboard of the present invention to play games. Consequently, the amusement efficacy is achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A luminous keyboard with a gaming function, the luminous keyboard comprising:
   a gaming program, wherein when the gaming program is executed, a game is performed;
   plural keys exposed outside the luminous keyboard, wherein when one of the plural keys is pressed down, a corresponding pressing signal is generated;
   plural light-emitting elements aligned with the plural keys, respectively, wherein when one of the plural light-emitting elements is turned on to emit a light beam, the corresponding key is illuminated; and
   a control unit connected with the plural keys, the plural light-emitting elements and the gaming program, wherein the control unit turns on or turns off the plural light-emitting elements according to settings of the gaming program, or the control unit turns off the light-emitting element corresponding to the illuminated key when the control unit receives the pressing signal corresponding to the illuminated key, and while the gaming program is executed to perform the game and the control unit turns on the light-emitting element, the gaming program calculates a gaming score by judging whether the pressing signal corresponding to the illuminated key is received by the control unit within a predetermined time interval, wherein if the pressing signal corresponding to the illuminated key is received by the control unit within the predetermined time interval, the gaming program increases the gaming score and the control unit turns off the light-emitting element corresponding to the illuminated key, wherein if the pressing signal corresponding to the illuminated key is not received by the control unit within the predetermined time interval, the gaming program does not increase or decrease the gaming score and the control unit controls the light-emitting element corresponding to an unilluminated key to emit the light beam.

2. The luminous keyboard according to claim 1, wherein the luminous keyboard further comprises a main circuit board, and the control unit is installed on the main circuit board, wherein the gaming program is a firmware component that is burnt in the main circuit board and electrically connected with the control unit.

3. The luminous keyboard according to claim 1, wherein the luminous keyboard is connected with a computer system, and the gaming program is a software component that is installed in the computer system.

4. A luminous keyboard with a gaming function, the luminous keyboard comprising:
   a gaming program, wherein when the gaming program is executed, a game is performed;
   plural keys exposed outside the luminous keyboard, wherein when one of the plural keys is pressed down, a corresponding pressing signal is generated;
   plural light-emitting elements aligned with the plural keys, respectively, wherein when one of the plural light-emitting elements is turned on to emit a first color light beam or a second color light beam, the corresponding key is illuminated to generate a luminous effect corresponding to the first color light beam or the second color light beam; and
   a control unit connected with the plural keys, the plural light-emitting elements and the gaming program, wherein the control unit turns on or turns off the plural light-emitting elements according to settings of the gaming program, or the control unit turns off the light-emitting element corresponding to the illuminated key when the control unit receives the pressing signal corresponding to the illuminated key, or the control unit control unit turns on the light-emitting element corresponding to the unilluminated key when the control unit receives the pressing signal corresponding to the unilluminated key, wherein the gaming program calculates a gaming score by judging whether at least two illuminated keys having the same luminous effect are neighboring keys.

5. The luminous keyboard according to claim 4, wherein the luminous keyboard further comprises a main circuit board, and the control unit is installed on the main circuit board, wherein the gaming program is a firmware component that is burnt in the main circuit board and electrically connected with the control unit.

6. The luminous keyboard according to claim 4, wherein the luminous keyboard is connected with a computer system, and the gaming program is a software component that is installed in the computer system.

7. The luminous keyboard according to claim 4, wherein while the gaming program is executed to perform the game and the control unit turns on the light-emitting elements, the gaming program judges whether at least two illuminated keys having the same luminous effect are neighboring keys, wherein if the gaming program judges that the at least two illuminated keys having the same luminous effect are neighboring keys, the control unit turns off the light-emitting elements corresponding to the at least two keys and the gaming program increases the gaming score, wherein if the gaming program judges that the illuminated keys having the same luminous effect are not neighboring keys, the gaming program further judges whether the pressing signal corresponding to a specified illuminated key of the at least two illuminated keys is received by the control unit.

8. The luminous keyboard according to claim 7, wherein if the pressing signal corresponding to the specified illuminated key of the at least two illuminated keys is received by the control unit, the control unit turns off the light-emitting element corresponding to the specified illuminated key and the control unit further judges whether the pressing signal corresponding to the unilluminated key is received by the control unit, wherein if the pressing signal corresponding to the unilluminated key is not received by the control unit, the gaming program further judges whether the pressing signal corresponding to the specified illuminated key is received by the control unit.

9. The luminous keyboard according to claim 8, wherein if the pressing signal corresponding to the specified unilluminated key is received by the control unit, the control unit turns on the light-emitting element corresponding to the specified unilluminated key and the gaming program further judges whether at least two illuminated keys having the same luminous effect are neighboring keys, wherein if the gaming program judges that the pressing signal corresponding to the specified unilluminated key is not received by the control unit, the gaming program further judges whether the pressing signal corresponding to the unilluminated key is received by the control unit.

10. The luminous keyboard according to claim 9, wherein if the gaming program judges that at least two illuminated keys having the same luminous effect are neighboring keys, the control unit turns off the light-emitting elements corresponding to the at least two keys and the gaming program increases the gaming score, wherein if the gaming program judges that the illuminated keys having the same luminous effect are not neighboring keys, the gaming program does not increase the gaming score and the control unit turns on the light-emitting element corresponding to the unilluminated key randomly.

* * * * *